United States Patent [19]
DeBiasse

[11] 4,143,564
[45] Mar. 13, 1979

[54] APPARATUS FOR SIMULTANEOUSLY FORMING SELECTED CIRCUMFERENTIAL AND AXIAL PROFILES ON A WORKPIECE

[75] Inventor: Richard L. DeBiasse, Chatham Township, Morris County, N.J.

[73] Assignee: Hardinge Brothers, Inc., Elmira, N.Y.

[21] Appl. No.: 803,685

[22] Filed: Jun. 6, 1977

[51] Int. Cl.² ............................ B23B 5/24; B23B 3/28
[52] U.S. Cl. ......................................... 82/19; 82/14 R
[58] Field of Search .................................. 82/19, 14 R

[56] References Cited
U.S. PATENT DOCUMENTS

| 2,225,409 | 12/1940 | Bromley | 82/19 |
| 2,735,420 | 2/1956 | Dall | 125/11 |
| 3,194,092 | 7/1965 | Piotrowski | 82/14 R |
| 3,373,640 | 3/1968 | Allen, Sr. et al. | 82/14 A |
| 3,983,770 | 10/1976 | Skrentner et al. | 82/19 |

FOREIGN PATENT DOCUMENTS

519619  3/1955  Italy ............................................ 82/19

Primary Examiner—Leonidas Vlachos
Attorney, Agent, or Firm—Shlesinger, Arkwright, Garvey & Dinsmore

[57] ABSTRACT

Selected circumferential and axial profiles are formed simultaneously on a rotating workpiece by apparatus that comprises a carrier that is mounted for movement toward and away from the workpiece and carries a cutting element which is pushed by a spring into engagement with the workpiece. The carrier simultaneously follows a circumferential cam that rotates conjointly with the workpiece and an axial cam that is mounted on a follower bar. The follower bar is mounted on the carrier for movement relative to the carrier solely along an axis parallel to and spaced from the axis of rotation of the workpiece. The axial cam and follower are in series relation to the circumferential cam and follower so that movements of the cutting element toward and away from the workpiece generated by the tracking by the follower bar of the circumferential cam are superimposed on movements of the carrier toward or away from the workpiece generated by the tracking of the axial cam by the carrier as the carrier and the cutting element thereon move parallel to the axis of rotation of the workpiece.

8 Claims, 6 Drawing Figures

APPARATUS FOR SIMULTANEOUSLY FORMING SELECTED CIRCUMFERENTIAL AND AXIAL PROFILES ON A WORKPIECE

BACKGROUND OF THE INVENTION

Although the pistons used in reciprocating type internal combustion engines are nominally "cylindrical," they have in practice been contoured or profiled to take into account the differential thermal expansion that takes place in normal operating conditions. The head of a piston becomes heated to a significantly higher temperature than the skirts, and there is thus a temperature gradient along the length of the piston which means that the piston "grows" to different extents in different axial parts. Moreover, there are differentials in the growth of the piston at different circumferential locations. Accordingly, it is common to either grind or machine a piston to a selected circumferential profile and a selected axial profile to provide desired profiles after the piston grows due to thermal expansion in operation.

By far the most common way of forming the desired axial and circumferential profiles on pistons is by cam-grinding. Cam-grinding involves the use of a grinding stone which is dressed to an axial profile conforming to the desired axial profile to be put on the piston. The desired circumferential profile is provided by moving the piston toward and away from the grinding stone (or vice versa) in coordination with the rotation of the piston, the piston being translated toward and away from the stone (or vice versa) by a cam having a circumferential profile that matches the desired circumferential profile formed on the piston (hence, the name "cam-grinding"). Cam-grinding is an expensive operation in terms of labor time and tooling costs, and it is difficult to control tolerances because the stone wears at different rates in different places. Good control over tolerances requires frequent dressing of the stone.

A small proportion of the total number of pistons produced are finished to the desired axial and circumferential profiles by machining. Most of the machining techniques involve the use of a master cam having circumferential and axial profiles matching the desired profile to be machined on the piston and rotated in one spindle. The workpiece rotates in another spindle at the same speed, and a cutting tool in guided under the control of the stylus that follows the master cam, either by a direct mechanical linkage between the stylus and the tool or by a hydraulic tracing system that is under the control of the cam. Machine profiling is also expensive, slow, and difficult to control with precision.

SUMMARY OF THE INVENTION

There is provided, in accordance with the present invention, apparatus for simultaneously forming selected circumferential and axial profiles on a workpiece, the apparatus being intended primarily for use in a manufacture of pistons but being susceptible of adaptation to any operation in which it is desired to form different, mutually perpendicular contours on an object. The apparatus involves rotating the workpiece about a fixed axis and moving a cutting tool along an axis parallel to that axis of rotation, the movements of the tool toward and away from the axis to form the profiles being controlled by a circumferential cam having a circumferential cam surface matching the desired circumferential profile and a separate axial cam having an axial cam surface conforming to the axial profile to be formed on the workpiece.

More particularly, the apparatus comprises a carrier that is mounted for movement toward and away from the workpiece and carries a cutting element for engagement with the workpiece. The carrier is pushed toward the workpiece by a spring (or an equivalent device, such as a pneumatic piston that exerts a force but yields) to engage the cutting element with the workpiece. A suitable drive moves the carrier along an axis parallel to the axis of rotation of the workpiece. An elongated cam follower bar is mounted on the carrier for movement relative thereto solely along an axis parallel to and spaced from the axis of rotation of the workpiece. A circumferential cam is mounted for rotation conjointly with the workpiece about the axis of rotation thereof, and an axial cam is mounted on the follower bar, which also carries a circumferential cam follower that engages the surface of the circumferential cam. Hence the follower bar tracks the circumferential cam and moves the carrier, and therefore the cutting element, toward and away from the axis of rotation of the workpiece to form the selected circumferential profile on the workpiece. An axial cam follower engages the axial cam and is interposed in series with the circumferential cam follower so that the carrier also tracks the axial cam. Thus the axial profile is superimposed on the circumferential profile.

In the embodiment described in detail below and shown in the drawings, the axial cam is mounted on a holder that in turn is mounted on the carrier for movement relative to the carrier toward and away from the workpiece, and the spring or its equivalent pushes the holder into engagement with the workpiece. In that embodiment the follower bar tracks the circumferential cam, as described above, and the axial cam on the holder causes the holder to track the axial cam relative to the follower bar. Thus the movements of the cutting element are actually a combination of movements originating separately, first, with the circumferential cam follower on the follower bar which transmits the circumferential profile to the follower bar and the carrier and, second, with the axial cam follower which transmits the axial profile from the axial cam to the holder.

In a mechanically and functionally equivalent variation of the arrangement of the embodiment shown in the drawings, the axial follower is interposed between the circumferential follower and the follower bar, and the holder is omitted. In such an arrangement the path of forces generating movements of the cutting element to form the desired profiles originates with the circumferential cam follower, which tracks the circumferential cam and moves the axial follower, which in turn works against the axial cam on the follower bar. The follower bar in turn moves the carrier and the cutting tool toward or away from the workpiece. The series relationship between the circumferential and axial cams thus automatically superimposes the axial and circumferential profiles on the movements of the cutting tool, as in the embodiment shown in the drawings.

The apparatus, according to the present invention, may be constructed as a device that can be attached to commercially available, general purpose machine tools, such as lathes or automatic chuckers, and the embodiment shown in the drawings is indeed so constructed. On the other hand, the apparatus can be integrated into a machine that is specially designed for profiling pistons.

Another aspect of the invention involves a modification of the apparatus to make it capable of providing different circumferential profiles in different parts of the piston. For example, the piston head may have a circumferential profile different from that of the skirts. The modification of the apparatus involves, in one form, the use of a circumferential cam having two circumferential cam surfaces side by side and means for shifting the circumferential cam follower from one of such cam surfaces to the other in coordination with the movement of the carrier parallel to the axis of rotation of the piston. For example, the absolute position of the follower bar may be shifted by a guide that is moved parallel to the axis of the follower bar relative to the circumferential cam and a gear or other drive for shifting the guide in coordination with movement of the machine carriage. In such an arrangement, the movement of the carriage controls the movement of the follower bar transversely along the circumferential cam to shift the circumferential cam follower from one of the cam surfaces to the other. Essentially, the same apparatus can be used with a circumferential cam that has several different circumferential cam surfaces or that has a circumferential profile that varies continuously in the axial direction, thus to vary the circumferential profile as some function of the axial movement of the carrier in the course of machining the piston.

Among the preferred features of the apparatus embodying the present invention are the following:
1. the carrier is mounted on needle bearings so that it moves smoothly and precisely;
2. the spring pusher applies a force that is substantially parallel to the axis of movement of the cutting element at a point closely adjacent to such axis of movement, thereby to minimize any tendency for cocking of the holder due to an eccentric pushing force;
3. the circumferential cam follower is mounted on the follower arm for adjustment radially of the circumferential cam so that the diameter of the workpiece can be pre-established very precisely by setting the proper dimensional relationship between the cutting element and circumferential cam follower.

The invention may be better understood by consideration of the following description of an exemplary embodiment, taken in conjunction with the figures of the accompanying drawings.

DESCRIPTION OF AN EMBODIMENT

The embodiment of the invention shown in FIGS. 1 to 5 is an attachment that can be mounted on a commercially available automatic chucker, the chucker being shown schematically in the drawings. The chucker includes a spindle 10, a drive, which is enclosed within a housing 12, for rotating the spindle about a fixed axis, and a thread-chasing head 14 having a key-shaped slot 16 in which any of a variety of accessory tools can be mounted in a selected position. The head 14 is mounted on a bar 18 which is moved axially by a drive (not shown) along an axis parallel to the axis of rotation of the spindle. The speed of such movement can be changed by shifting a transmission in the drive system, and the head 14 and shaft 18 are driven by the drive system in one direction (to the left in FIGS. 1 and 2) and returned in the other direction by a spring return. The head 14 and shaft 18 are also coupled to a hydraulic mechanism which automatically lifts them up at the end of a machining operation, disengages the drive, and rapidly returns the chasing head in the other direction to the starting point where it is ready to begin another machining operation on another workpiece.

It will be readily apparent to those skilled in the art that the present invention can be adapted to any sort of machine tool constructed to rotate a workpiece about a fixed axis and to move a tool along an axis parallel to and spaced from the axis of rotation of the workpiece, the latter component of such a machine being referred to herein as a "carriage" and being any mechanically or hydraulically driven device capable of moving a "cutting element," such as a cutting bit or grinding stone or wheel, along a path parallel to the axis of rotation of a workpiece. The apparatus shown in FIGS. 1 to 4 and described thus far is not, per se, a part of the present invention, but such components (i.e., a device for rotating a workpiece about a fixed axis and a device for moving a cutting element along a path parallel to the axis of rotation of the workpiece) are necessary for the use of the apparatus of the invention. The following description of that apparatus, which, for convenience, will be referred to hereinafter as a compound profiling tool, exemplifies the invention in the context of a commercially available automatic chucker of the type shown schematically in the drawings.

The compound profiling tool 20 comprises a mounting base 22 which, as viewed in front elevation (FIGS. 1 and 2), is generally rectangular and which includes at the right end (as viewed from the front) a portion 22a that is generally triangular in cross section and at the left end a portion 22b that is rectangular in cross section. The back face of the portion 22a is inclined to the vertical to match the inclined front face 14a of the chasing head 14. The base 22 is adapted to be mountd on the chasing head 14 by a bar of "T"-shaped cross section 26 (a T-bar) that slides into the matching T-slot 16 on the chasing head 14 and is pulled tightly into engagement with the overhanging flanges of the T-slot 16 by bolts 28. A flange 30 projects from the back face of the base 22 and engages a lateral surface on the chasing head 14, the flange 30 serving to align the tool with respect to the axis of rotation of a workpiece mounted in the machine spindle (the drawings illustrating a piston P mounted in the spindle 10).

The front face of the base 22 is formed with a wide, shallow vertical slot 32, and a carrier 34, which is mounted in the slot 32 for movement vertically, thereby to move along an axis that lies in a plane perpendicular to the axis of rotation of the piston P. The carrier 34 is mounted on four sets of needle bearings, one set being located in each of four vertical races 36, 37, 38 and 39, two of which (37 and 38) are located in the back face and two of which (36 and 39) are located in oblique side walls (see particularly FIG. 3). The carrier is held and guided in the slot 32 by a fixed-position retainer 40 fastened by screws 42 in the left side of the slot and an adjustable retainer 44 fastened by screws 46 in the right side of the slot. A pair of adjusting screws 48 threaded through bosses 50 on the base 22 work against the adjustable retainer 44 and facilitate adjusting the retainer to provide smooth and precise vertical movement of the carrier relative to the base 22. The top and bottom walls of the carrier 34 receive bearing retainer plates 52 and 54 which are fastened by screws 56 and 58 to the carrier 34. The extent of vertical movement of the carrier 34 in the slot 32 is limited by stop screws 60 installed on the base 22 at the top and bottom of the slot 32 with their heads projecting from the wall of the slot for engagement with the end walls of recesses formed in the back wall of the carrier 34. The stop screws 60 are provided merely to retain the carrier in the slot when the tool 20 is removed from the machine or when it is partly disassembled while on the machine.

It will be recalled from the foregoing that the chasing head 14 is lifted up at the end of each stroke; hence, an adjustable stop 62, consisting of a screw 64 threaded into the top of the carrier 34 and an adjustable collar 66, is provided to prevent the carrier from shifting downwardly in the slot to a position where the cutting bit will engage the piston on the return stroke after the piston has been machined and the head 14 lifts and returns to the right.

Figure 1:
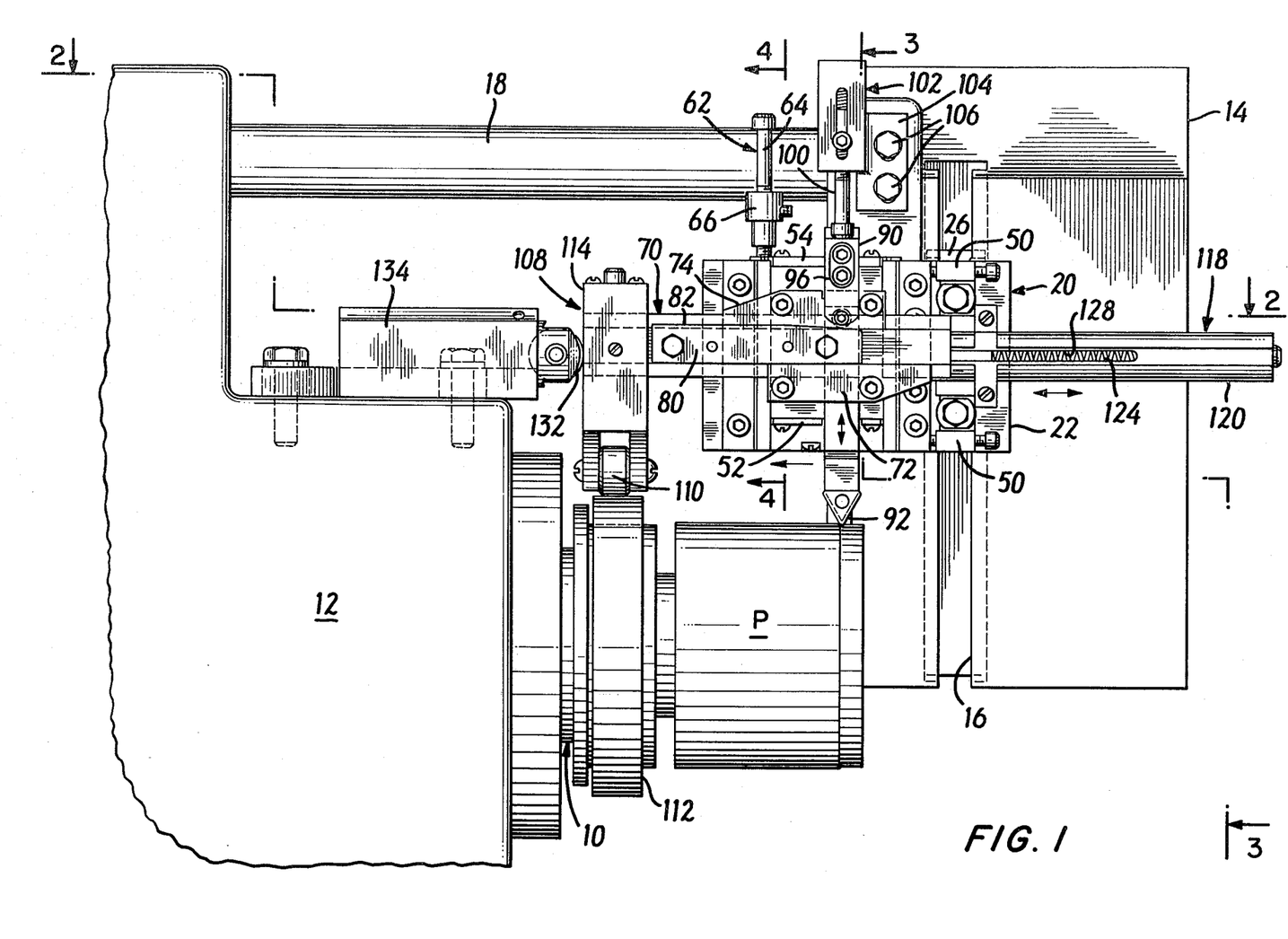
FIG. 1 is a front elevational view of apparatus embodying the invention.
Figure 1A:
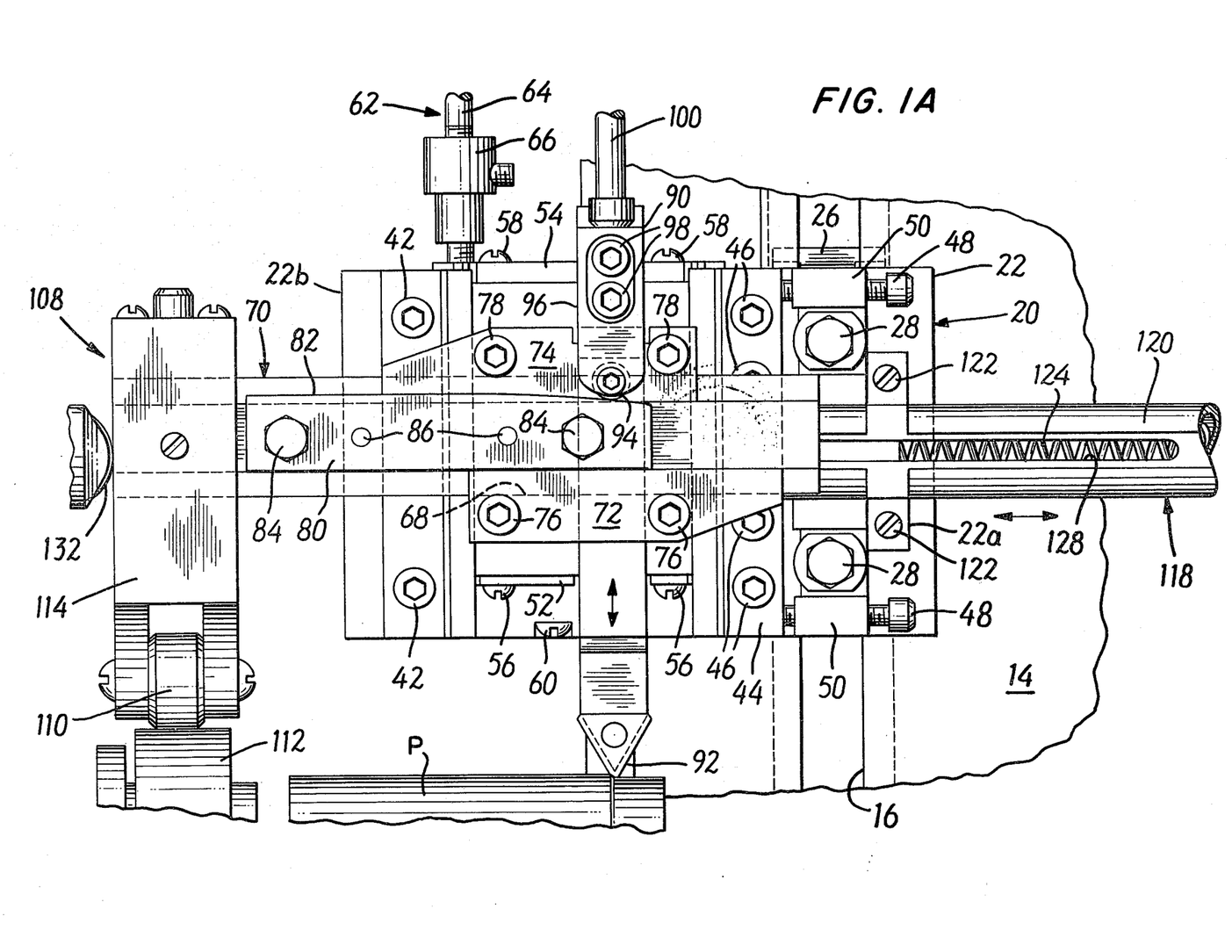
FIG. 1A is a fragmentary front elevational view of the apparatus of FIG. 1 on a larger scale than FIG. 1.
Figure 2:
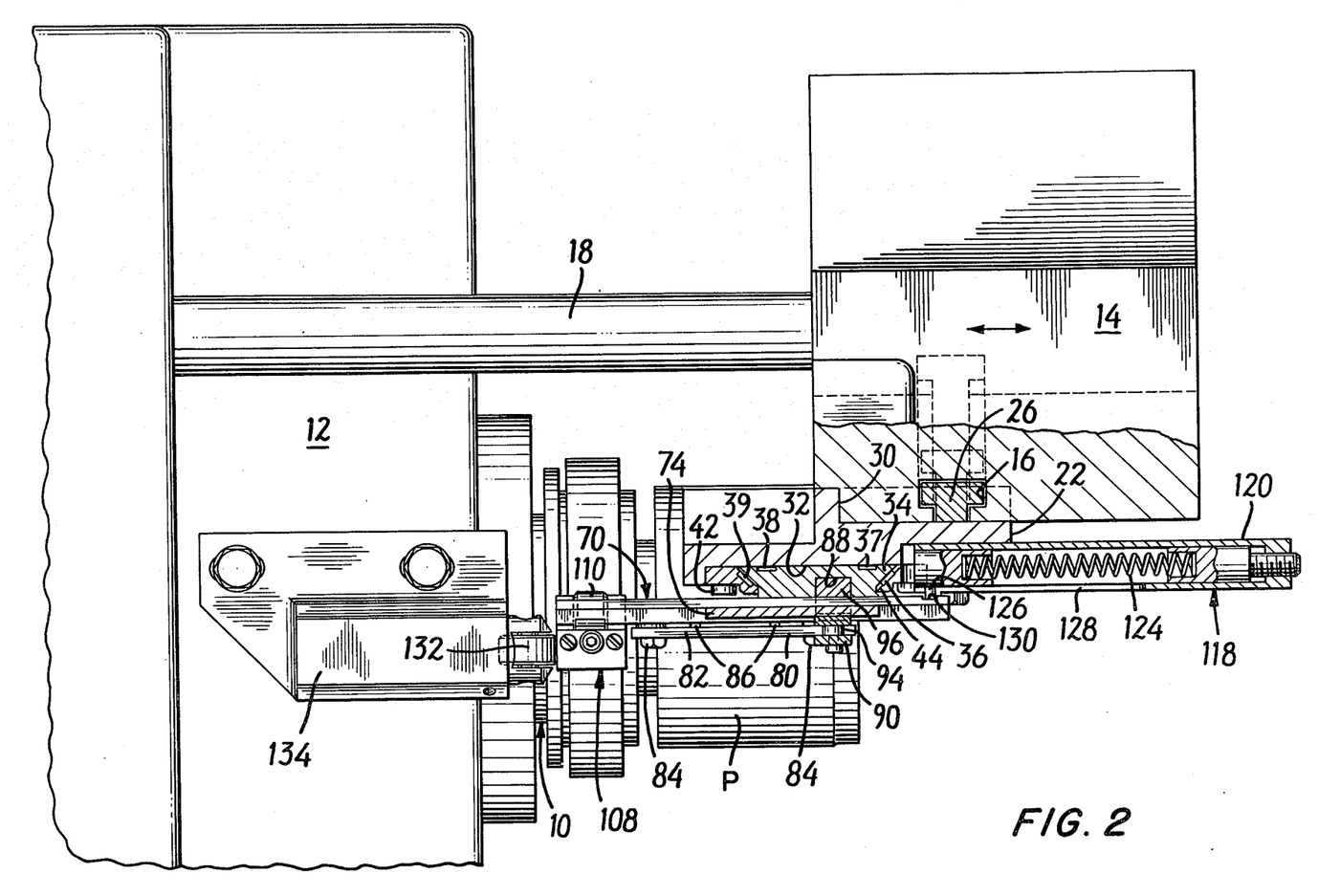
FIG. 2 is a top view partly in full and partly in section of the apparatus, the plane of the section being represented generally by the lines 2—2 of FIG. 1.
Figures 3, 4:
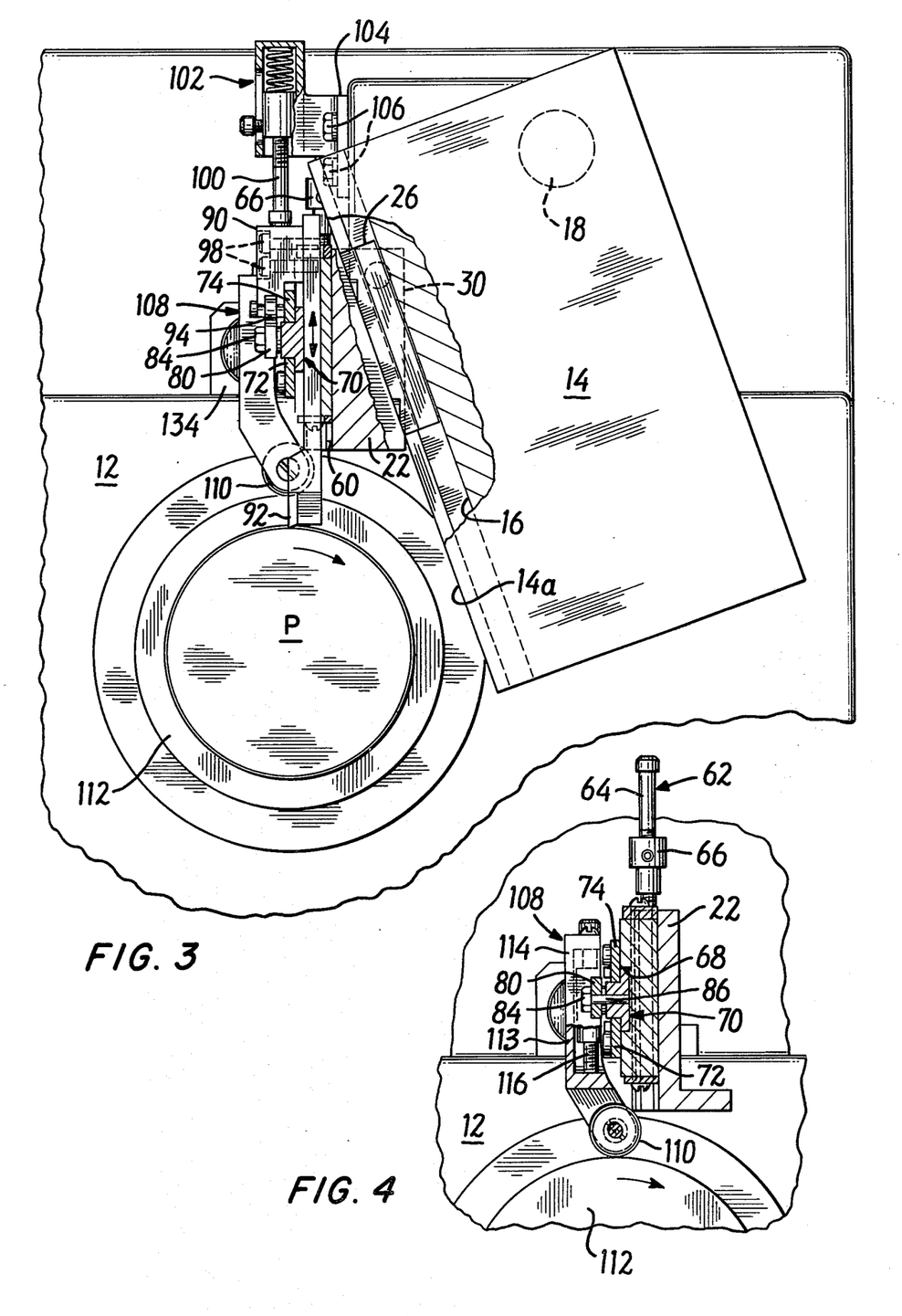
FIG. 3 is an end view of the apparatus of FIG. 1 shown partly in section and partly in elevation, as represented by the lines 3—3 of FIG. 1.
FIG. 4 is an end cross-sectional view of a part of the apparatus, the view being taken generally along the lines 4—4 of FIG. 1 and in the direction of the arrows.

As may best be seen in FIG. 3, the front part of the carrier 34 stands out from the base 22 of the tool, and, as best appears in FIGS. 2 and 4, is provided with a horizontal slot 68. The slot 68 receives with a sliding fit a follower bar 70 of T-shaped cross section which is retained in the slot and receives guiding support from a pair of retainer plates 72 and 74 which are fastened by screws 76 and 78 to the carrier 34. The follower bar is thus mounted on the carrier solely for movement relative to the carrier along an axis parallel to the axis of rotation of the piston. An axial cam 80 having a cam surface 82 formed in its upper edge, which surface matches the axial profile to be formed on the piston P, is fastened by screws 84 to the front face of the follower bar 70. The axial cam 80 is precisely positioned, relative to the longitudinal axis of the follower bar 70, by locating pins 86.

The carrier 34 also has a vertical slot 88 which receives with a sliding fit a holder 90. The holder is adopted to receive a chip-type triangular cutting bit 92 at its lower end, and an axial cam follower roller 94 carried by a bracket 96 is mounted at the upper end of the holder 90 by a pair of screws 98.

The upper end of the holder 90 is engaged by the output plunger 100 of a spring mechanism 102 that is mounted by way of a bracket 104 secured by bolts 106 to the chasing head 14. The spring-driven plunger 100 pushes the holder downwardly, thereby to engage the roller follower 94 with the axial cam surface 82. As will be more apparent from the description below of the mode of operation of the tool, it is the spring mechanism 102 which applies the acting force to the tool to push the cutter 92 against the workpiece, i.e., the piston P, and to keep the followers in tracking engagement with the cams.

The left end of the follower bar 70 carries a follower assembly 108, which includes a follower roller 110 that engages the circumferential cam surface of a circumferential cam 113. The cam surface of the cam 112, which is an annular member suitably attached to a special holder mounted in the machine spindle 10, has a profile that matches the desired profile to be formed on the piston. The follower assembly 108 includes a bracket 112 that is affixed to the follower bar 70 and a movable follower roller carrier 114 that is adjustable vertically with respect to the bracket 112 by an adjusting screw 116 that bears against the lower end of the roller carrier 114 and is locked in position by a set screw. The follower assembly 108 is thus adapted for precise adjustment of the roller relative to the axis of movement of the follower bar 70. Accordingly, the position of the tip of the cutting tool 92 can be set precisely with respect to the circumferential cam 112, thus to set up the tool to the precise diameter of the piston. In practice this is done by positioning the various components with the cam followers at predetermined positions, setting a height gauge between the bed on the machine and the cutting bit 92, and then adjusting the circumferential follower 110 using the adjusting screw 116 to position the bit 92 at the known height above the bed for the diameter in question.

In the embodiment of FIGS. 1 to 4, the follower bar 90 remains stationary in the horizontal direction throughout the operation of the apparatus. It is held in that position by a spring mechanism 118 which consists of a housing 120 secured by screws 122 to the right end of the base 22 and containing a spring 124 which pushes against the right end of the follower bar 70 by means of a drive pin 126 which projects out through an axial slot 128 in the housing 120 and into a groove or hole 130 in the back wall of the follower bar 70. The spring mechanism 118 yieldably pushes the following bar 70 to the left, relative to the base 22 of the tool, against a guide roller 132 that is rotatably mounted on a bracket 134, which is, in turn, bolted to the housing of the automatic chucker machine, and that bears against the circumferential follower assembly 108.

FIGS. 1 to 4 show the tool part way through a profiling operation conducted on a piston P. The operation may be considered to begin when the drive of the chasing head 14 engages and the chasing head starts to move from right to left. At the beginning of the operation the base 22, carrier 34 and holder 90 of the tool are positioned somewhat to the right of the positions shown in the drawings, thus to have the cutting tool 92 positioned a short distance clear to the right of the head end of the piston. The spring mechanism 118, however, holds the follower bar 70 in the position shown with the circumferential follower assembly 108 in engagement with the guide roller 132, thus to retain the circumferential follower 110 in proper tracking position in engagement with the circumferential cam 112.

Upon engagement, the chasing head drive moves the chasing head from right to left, thereby moving the base 22, carrier 34, and holder 90 to the left. The cutting tool 92 is spring-loaded by the spring mechanism 102 downwardly to engage the axial follower 94 with the axial cam 80. The vertical position of the axial cam at any instant is a function of the vertical position of the follower bar 70, which position is under the control of the position of the circumferential cam follower 110. In other words, as the base 22, carrier 34 and holder 90 translate to the left, the vertical position of the cutting tool 92 is under the control of (1) the circumferential cam, by virtue of the vertical movement as a unit of the follower assembly 108 and the follower bar 70, and also (2) the axial cam, by virtue of vertical movement of the holder 90 relative to the carrier as the axial follower 94 tracks the axial cam 80. The holder 90 follows the axial cam 80 by moving relative to the carrier 34, and the holder 90 and carrier 34 both move with the follower bar 70 as the circumferential cam follower 110 tracks the circumferential cam 112. Thus, the axial profile is superimposed on the circumferential profiles as established, respectively, by the axial cam 80 and the circumferential cam 112. Throughout the profiling operation the follower bar 70, and, therefore, the circumferential follower mechanism 108, remain horizontally stationary by virtue of the spring force applied by the spring mechanism 118 between the base 22 (and the chasing head 14) and the follower bar 70. Nonetheless, the spring mechanism 118 is inherently a lost-motion device, the spring 124 being loaded progressively as the chasing head moves to the left.

At the end of the profiling operation the chasing head 14 and the shaft 18 on which it is mounted are lifted hydraulically, thereby disengaging the chasing head drive and enabling the spring return device on the machine to push the chasing head and the base, carrier and holder of the tool rapidly back to the starting position. When the chasing head 14 lifts up, it lifts with it the base 22, but the carrier 34, and therefore the follower bar 70 and cam follower assembly 108, are driven relatively downwardly by the spring drive 102. The stop assembly 62 on the carrier 34 limits the amount of downward movement of the parts just referred to. Return of the chasing head 14 to the starting position ends a cycle of operation.

The compound profiling tool shown in the drawings and described above is inherently backlash free; the spring mechanism 118 maintains precise tracking of the roller 110 on the cam 112, and the drive spring mechanism 102 always pushes down on the holder, which, in turn, pushes down on the axial cam 80, the follower bar 70, and the circumferential follower assembly 108. The unidirectional force system, which involves springs that always act in one direction, assures precise repeatability from piece to piece; all deflections and movements are ultimately under the influence of the unidirectional drive springs. Inasmuch as the cam surfaces of the tool are, at least in the embodiment shown in FIGS. 1 to 4, curved in only one direction, they are very much less expensive than the one-to-one master cams used in previously known apparatus for machining compound profiles on pistons. The tool of the present invention also permits changing separately either the circumferential cam or the axial cam with other cams having different profiles, thus making it very easy to set up the machine to make different pistons.

Figure 5:
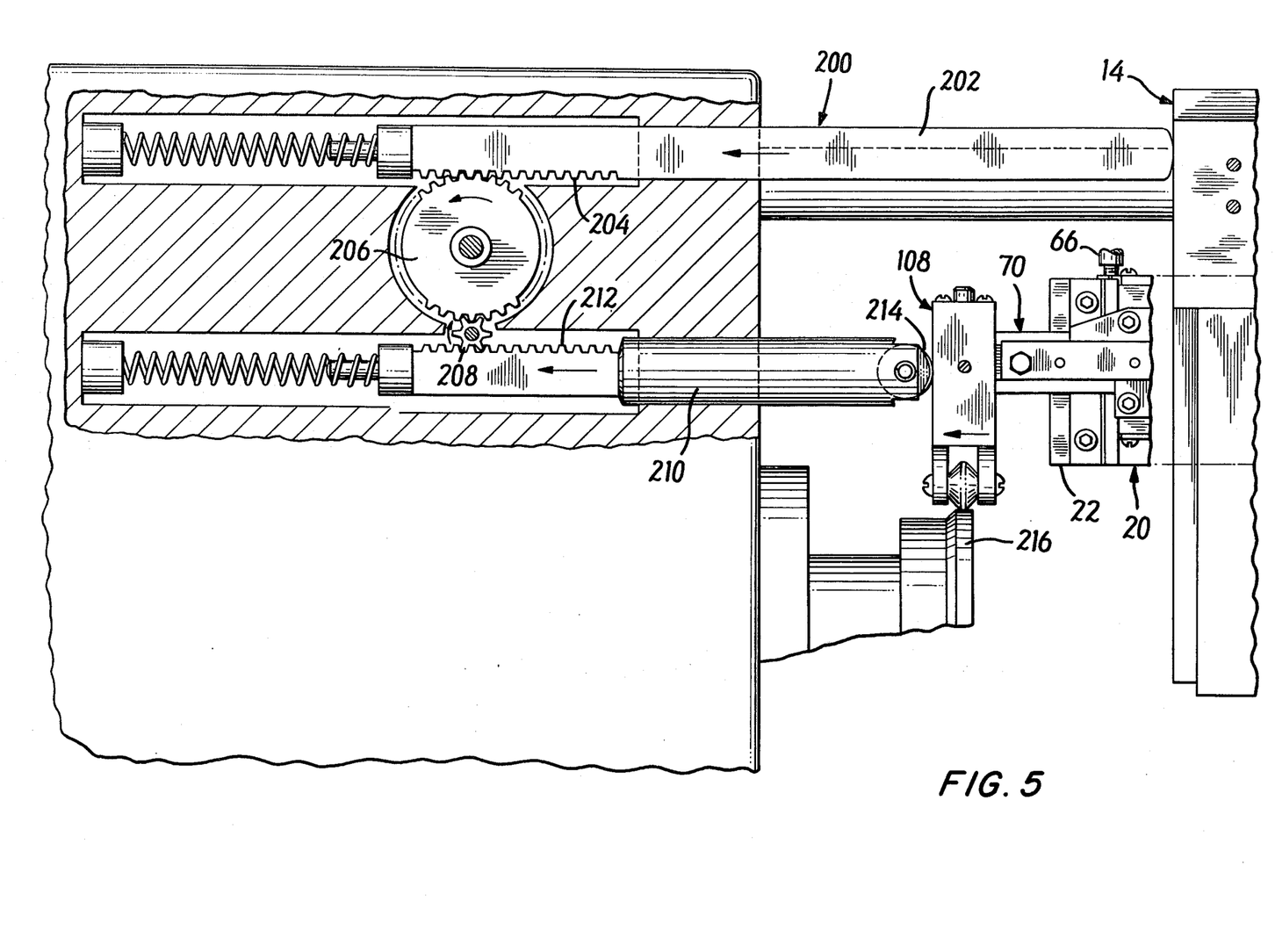
FIG. 5 is a top view in schematic form showing a modification of the apparatus of FIGS. 1 to 4 that permits different circumferential profiles to be formed in different portions of the walls of a piston.

FIG. 5 of the drawings illustrates a modification of apparatus embodying the present invention, the modification being shown schematically and involving only the replacement of the fixed guide roller 132 which holds the circumferential follower assembly in tracking position on the circumferential cam and the substitution of different circumferential and axial cams for the ones depicted in FIGS. 1 to 4 of the drawings.

More particularly, instead of having the circumferential follower assembly 108 and the follower bar 70 remain axially stationary throughout the profiling operation, a mechanism 200 for moving the follower bar is substituted for the fixed guide 132. The mechanism comprises a spring-loaded plunger 202 which engages the follower head 14 (or it can engage the base 22 of the profiling tool) and has a rack gear 204 located adjacent one end. The rack gear drives a larger pinion gear 206 which, in turn, drives a smaller pinion gear 208, the two pinion gears constituting a reducer gear train. A second spring-loaded plunger 210 having a rack gear 212 meshing with the smaller pinion gear 208 carries a guide roller 214 which engages the circumferential follower assembly 108.

The device 200 shown in FIG. 5 is used in conjunction with a circumferential cam 216 which has two or more circumferential cam surfaces in different adjacent bands, each such surface being shaped to match a selected circumferential profile to be formed in a selected axial part of the piston. The cam 216 may, alternatively, have a surface formed with a profile that varies along its axial extent, thus to vary continuously the circumferential profile along the axial extent of the piston. The operation of the modified structure of FIG. 5 is very similar to that of the embodiment shown in FIGS. 1 to 4, the only difference being that the guide 214 moves to the left in a proportion established by the gear ratio in the mechanism 200 in response to the movement of the chasing head in the course of the profiling operation. During the first part of the operating cycle the circumferential profile of the right part of the cam 216 (as viewed in FIG. 5) is formed on the head end of the piston, and for the remainder of the cycle, the circumferential profile of the left portion of the circumferential cam 216 is formed on the piston. The transition between the two profiles can occur at a ring groove.

It will be apparent to those skilled in the art that numerous variations and modifications of the compound profiling tool shown in the drawings can be made without departing from the spirit and scope of the invention. One such modification involving relocation of the axial cam and cam follower so that they are located between the circumferential cam follower and the follower bar has been described in the section entitled "Summary of the Invention" hereof. Another modification is the elimination of the spring mechanism 118 which holds the circumferential follower assembly 108 and the follower bar assembly 70 in the desired position in tracking relation to the circumferential cam 112 or the modified assembly shown in FIG. 5 and the substitution therefor of a vertical guide assembly associated with the circumferential follower. For example, such as assembly may involve a pair of guide rollers substituted for the rollers 132 or 214, one such guide roller being located on either side of the follower assembly 108 to hold it in the desired fixed or movable position axially (with respect to the follower bar 70) while permitting it to track the cam radially relative to the axis of rotation of the piston.

I claim:

1. Apparatus for simultaneously forming a selected circumferential profile and a selected axial profile on a workpiece mounted for rotation about a fixed axis comprising a carrier mounted for movement toward and away from the workpiece and carrying a cutting element for engagement with the workpiece; means for yieldably pushing the carrier toward the workpiece to engage the cutting element therewith for work thereon; means for moving the carrier along an axis parallel to the axis of rotation of the workpiece; an elongated cam follower bar mounted on the carrier for movement relative thereto solely along an axis parallel to and spaced from the axis of rotation of the workpiece; a circumferential cam mounted for rotation conjointly with the workpiece about the axis of rotation of the workpiece and having a circumferential cam surface matching the circumferential profile to be formed on the workpiece; an axial cam mounted on the follower bar and having an axial cam surface matching the axial profile to be formed on the workpiece; a circumferential cam follower engaging the circumferential cam surface and interposed between the circumferential cam and the follower bar; means for controlling any movement of the follower bar along its axis relative to the circumferential cam; and an axial cam follower engaging the axial cam surface and interposed in series with the circumferential cam follower between the axial cam and the cutting element such that the cutting element tracks the axial cam and the axial profile is superimposed on the circumferential profile in the movement of the cutting tool parallel to the workpiece thereby to form the axial profile on the workpiece simultaneously with the circumferential profile.

2. Apparatus according to claim 1 and wherein the carrier includes a holder that is mounted thereon for movement relative thereto solely in a direction toward and away from said workpiece, said cutting element being mounted on said holder, said holder carrying said axial cam follower, and said means pushing the carrier toward said workpiece engaging said holder to push said follower bar and said carrier toward said workpiece.

3. A tool for use in a machine which has means for rotating a workpiece about an axis and a carriage for moving a tool along a path parallel to that axis, the tool being adapted to cut simultaneously in a workpiece placed in the machine at least one selected circumferential profile and at least one selected longitudinal profile and comprising a carrier for a cutting element having a base part adapted to be affixed to the tool moving means of the machine and a movable part mounted on the base part for movement toward and away from the workpiece along an axis lying in a plane substantially perpendicular to the axis of rotation of the workpiece; a circumferential cam having a circumferential cam surface shaped to match the selected circumferential profile to be formed on the workpiece and being adapted to be connected to said means for rotating the workpiece for rotation conjointly with the workpiece about the axis of rotation thereof; a follower bar mounted in a guideway on the movable part of the carrier along a longitudinal axis relative to the carrier parallel to and spaced from the axis of rotation of the workpiece and having a cam follower thereon positioned to engage the circumferential cam surface; means for controlling any movement of the follower bar along said longitudinal axis relative to the circumferential cam while permitting the follower bar to move transversely of said axis and parallel to the direction of movement of the movable part of the carrier and thereby track the circumferential cam; a longitudinal cam having a cam surface matching the selected longitudinal profile to be formed on the workpiece and mounted on the follower bar with the cam surface oriented relative to the axis of the workpiece to match the selected longitudinal profile to be formed thereon; a holder mounted in a guideway on the movable part of the carrier for movement along an axis lying in a plane perpendicular to the axis of rotation of the workpiece and adapted to receive a cutting element and having a cam follower thereon positioned to engage the longitudinal cam surface; and means engaging the holder for yieldably pushing the holder toward the workpiece and for thereby maintaining the cam follower thereon in tracking engagement with the longitudinal cam and the cam follower on the follower bar in tracking engagement with the circumferential cam.

4. A tool according to claim 3 wherein the means for controlling the axial movement of the follower bar includes a guide located in a fixed position relative to the circumferential cam and spring means acting between the base part of the carrier and the follower bar for yieldably pushing the follower bar into engagement with the guide while the carrier moves with the machine carriage and relative to the follower bar.

5. A tool according to claim 3 wherein the profile of the circumferential cam is different in different circumferential bands thereof, thus to provide different circumferential profiles on the workpiece in different longitudinal parts thereof in correspondence to the circumferential cam profiles, and wherein the means for controlling movement of the follower bar includes a guide mounted for movement parallel to the axis of the follower bar relative to the circumferential cam, means responsive to movement of the machine carriage for moving the guide along said parallel axis thus to change the track of the circumferential follower on the circumferential cam surface from one such band to another, and spring means acting between the base part of the carrier and the follower bar for yieldably pushing the follower bar into engagement with the guide while the carrier moves with the machine carriage and relative to the follower bar.

6. A tool according to claim 3 wherein the movable part of the carrier is mounted on the base part by needle bearings so that it moves smoothly and precisely in response to the circumferential cam follower.

7. A tool according to claim 3 wherein the means for pushing the holder toward the workpiece is a spring pusher disposed closely adjacent to and acting substantially parallel to the axis of movement of the cutter on the holder thus to minimize a tendancy for cocking of the holder due to the pushing force.

8. A tool according to claim 3 wherein the circumferential cam follower is mounted on the follower arm for adjustment radially of the circumferential follower such that the diameter of the workpiece can be pre-established by setting the proper dimensional relation between the cutting element and the circumferential cam follower.

* * * * *